No. 675,419. Patented June 4, 1901.
C. T. SITTIG.
GALVANIC BATTERY CELL.
(Application filed May 11, 1899.)
(No Model.)
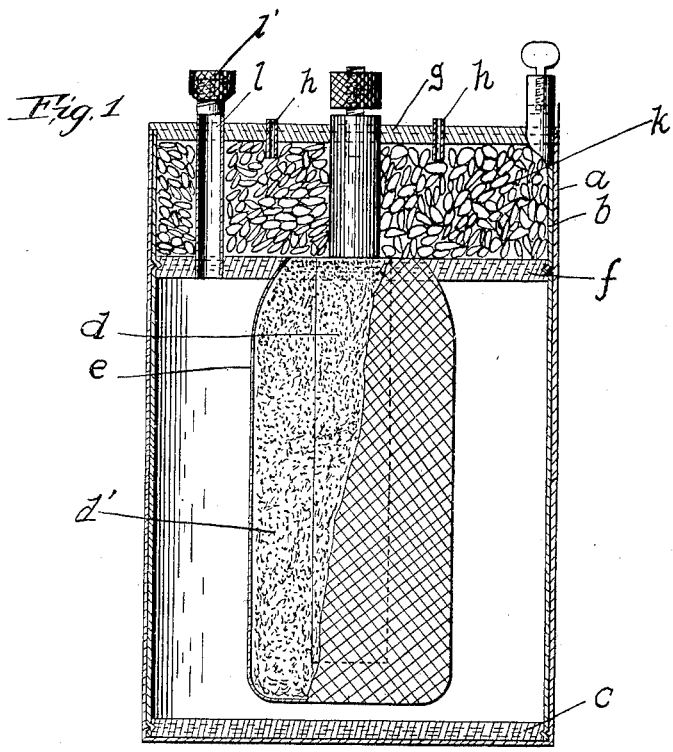
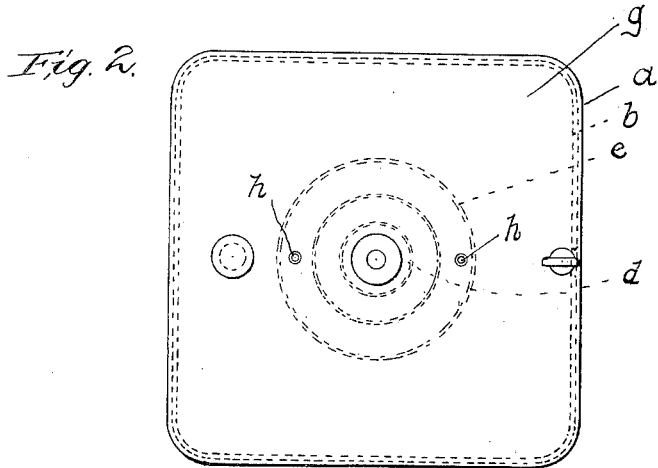
Witnesses
Max Zabel
O. Hubert
Inventor
Carl Theodor Sittig
By Charles A. Brown & Cragg
Attorneys.
THE NORRIS PETERS CO., PHOTO-LITHO., WASHINGTON, D. C.

UNITED STATES PATENT OFFICE.

CARL THEODOR SITTIG, OF GROSS-LICHTERFELDE, GERMANY, ASSIGNOR TO SIEMENS & HALSKE ELECTRIC COMPANY OF AMERICA, OF CHICAGO, ILLINOIS.

GALVANIC-BATTERY CELL.

SPECIFICATION forming part of Letters Patent No. 675,419, dated June 4, 1901.

Application filed May 11, 1899. Serial No. 716,385. (No model.)

*To all whom it may concern:*

Be it known that I, CARL THEODOR SITTIG, a subject of the German Emperor, residing at Gross-Lichterfelde, near Berlin, Germany, have invented a certain new and useful Improvement in Galvanic-Battery Cells, (Case No. 192,) of which the following is a full, clear, concise, and exact description.

My invention relates to an improved galvanic-battery cell, and has for its object the provision of a liquid-cell combining substantially the advantages both of a dry and a liquid battery.

The obvious advantages inherent in a dry battery are that the cells may be readily transported and may be placed in use in any position which is desirable. With the ordinary form of liquid-battery, however, the movement of charged cells usually involves spilling a great deal of the liquid, and, furthermore, such cells must be securely placed in upright positions to prevent the loss of the fluid, which also require frequent renewal because of evaporation. In the battery-cell of my invention I have obviated these defects commonly found in a liquid-battery.

I may briefly describe the cell of my invention as consisting of a sealed fluid-chamber containing the electrodes and the electrolyte in connection with a separate chamber adapted to receive and permit the escape of the gases forming within the first-named chamber.

My said invention will be more readily understood by reference to the accompanying drawings, wherein—

Figure 1 is a vertical sectional view of a battery-cell embodying my improvements, and Fig. 2 is a plan view thereof.

The same letters of reference are used to designate like parts in both figures of the drawings.

An outer shell $a$, of pasteboard, contains the cylindrical zinc electrode $b$, which is adapted to serve both as the negative pole of the battery and as a containing-casing for the cell. The bottom of the cell may be formed either of zinc or of a thin layer of asphaltum $c$, which serves to seal the lower part of the chamber. The carbon electrode $d$ is centrally disposed within the chamber, being surrounded by a suitable depolarizing substance $d'$, such as manganese dioxid, which depolarizing substance is retained within a gauze cell or sack $e$, surrounding the carbon. The liquid-chamber is sealed in by an asphaltum partition $f$, which engages the inner walls of the zinc casing and periphery of the gauze sack $e$. Upon the partition $f$ is disposed a layer of loosely-packed material, such as rice-chaff, and the entire cell is sealed by a top or lid $g$, of asphaltum, which engages the carbon electrode, the zinc, and the pasteboard casing. Through the lid $g$ extend two small glass tubes $h$, which reach within the central or auxiliary chamber $k$ and are adapted to conduct off the gases forming in and escaping from the liquid-chamber. An inlet $l$ is also provided, which preferably is formed of some insulating material, such as rubber, the said inlet extending through the outer lid and the partition to the liquid-chamber and being sealed by a removable screw-cap $l'$, disposed at the top of the battery-cell.

The cell may be filled with any desired electrolyte, as sal-ammoniac, through the inlet $l$, and a suitable quantity of water may be added thereto to fill the liquid-chamber when the cell is desired for use, or, if preferred, the fluid electrolyte may be poured within the liquid-chamber through the said inlet and sealed by means of the screw-cap $l'$. The gases forming within the chamber during the operation of the battery will pass from within the gauze sack $e$, through the depolarizing material, to chamber $k$, and thence escape, through the cellular or fibrous material contained therein and glass tubes $h$, to the air. It will be found, however, that the liquid is securely retained within the liquid-chamber even should the battery be employed in an inverted position and that there is practically no evaporation of the liquid.

I may construct the battery of square cross-section, as herein shown, or the same may indifferently be of cylindrical form.

Having now described a battery-cell constructed in accordance with my invention, I claim as new, and desire to secure by these Letters Patent, together with all such modi- fications as may be made by mere skill, the following:

1. In a battery-cell, the combination with a casing providing a fluid-chamber, of a chamber containing cellular material separated from the fluid-chamber, a cell or sack containing deoxidizing material, and also containing one of the electrodes, the said cell or sack being arranged within the fluid-chamber and being in communication with the cellular material, and vents affording outlets for gas from the chamber containing the cellular material, substantially as described.

2. In a battery-cell, the combination of a casing providing a fluid-chamber, of a partition arranged in said casing and dividing the same into fluid and cellular-material chambers, the said partition having an aperture, a cell or sack containing one of the electrodes, and also containing deoxidizing material, the said cell or sack being arranged within the fluid-chamber and having its upper ends arranged within the opening or aperture in the said partition, whereby its contents communicate with the cellular material, and vents affording outlets for gas from the chamber containing the cellular material, substantially as described.

3. In a battery-cell, the combination of a casing $b$ provided with a partition $f$ forming the upper portion of the casing into a chamber for cellular material, and the lower portion thereof into a fluid-chamber, the said partition having a central aperture or opening, a cell or sack $e$ arranged within the fluid-chamber and having its upper ends fitted within the aperture or opening in the partition $f$ and attached to the edges of said opening, an electrode arranged within the cell or sack and extended upwardly from the same, a tube extending from the fluid-chamber to the exterior of the battery, a seal for sealing the chamber provided for the cellular material, and vents $h$, $h$ affording outlets for gas from the chamber containing the cellular material, substantially as described.

In witness whereof I hereunto subscribe my name this 21st day of April, A. D. 1899.

CARL THEODOR SITTIG.

Witnesses:
    HENRY HASPER,
    WOLDEMAR HAUPT.